US009261907B2

(12) United States Patent
Nakamura et al.

(10) Patent No.: US 9,261,907 B2
(45) Date of Patent: Feb. 16, 2016

(54) ELECTRONIC DEVICE

(71) Applicant: FUJITSU LIMITED, Kawasaki-shi, Kanagawa (JP)

(72) Inventors: Takahiro Nakamura, Kawasaki (JP); Tomoyoshi Tadokoro, Kawasaki (JP); Tomoya Mitsugi, Asaka (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 14/186,466

(22) Filed: Feb. 21, 2014

(65) Prior Publication Data

US 2014/0313650 A1    Oct. 23, 2014

(30) Foreign Application Priority Data

Apr. 19, 2013    (JP) ................................. 2013-088686

(51) Int. Cl.
*G06F 1/16*    (2006.01)
*H04M 1/02*    (2006.01)
*H05K 5/00*    (2006.01)
*H05K 7/00*    (2006.01)

(52) U.S. Cl.
CPC ........... *G06F 1/1624* (2013.01); *H04M 1/0237* (2013.01); *H04M 1/0247* (2013.01)

(58) Field of Classification Search
CPC .................................................... G06F 1/1624
USPC ....................................... 361/679.04, 679.05
See application file for complete search history.

(56) References Cited

U.S. PATENT DOCUMENTS

| 5,768,096 | A  | * | 6/1998 | Williams et al. ......... 361/679.04 |
| 2010/0188350 | A1 | | 7/2010 | Sawada |
| 2012/0019993 | A1 | * | 1/2012 | Ou et al. .................. 361/679.01 |

FOREIGN PATENT DOCUMENTS

| JP | 2003-298700 A | 10/2003 |
| JP | 2007-124025 A | 5/2007 |
| JP | 2009-71588 A | 4/2009 |
| JP | 2009-109943 A | 5/2009 |

* cited by examiner

*Primary Examiner* — Hoa C Nguyen
*Assistant Examiner* — Binh Tran
(74) *Attorney, Agent, or Firm* — Westerman, Hattori, Daniels & Adrian, LLP (57) ABSTRACT

An electronic device includes an upper housing that has a display unit on an upper surface; a lower housing that supports the upper housing so as to enable sliding; a movable plate unit that is disposed on an upper surface of the lower housing to enabling sliding; and a movement mechanism that causes the movable plate unit to slide in a direction opposite to that of the upper housing, coinciding with a sliding of the upper housing with respect to the lower housing. The movement mechanism causes, during transition into a closed state, the movable plate unit to move beneath the upper housing such that an upper surface of the movable plate unit is hidden and causes, during transition into an open state, the movable plate unit to move in the direction opposite to that of the upper housing, exposing the upper surface of the movable plate unit.

3 Claims, 13 Drawing Sheets

ELECTRONIC DEVICE

CROSS REFERENCE TO RELATED APPLICATIONS

This application is based upon and claims the benefit of priority of the prior Japanese Patent Application No. 2013-088686, filed on Apr. 19, 2013, the entire contents of which are incorporated herein by reference.

FIELD

The embodiment discussed herein is related to an electronic device.

BACKGROUND

A conventional mobile information terminal apparatus has a display unit in respective housings that are foldably coupled to one another and that when unfolded, provide a screen of a large display size (see, e.g., Japanese Laid-Open Patent Publication No. 2003-298700). Further, in the housing of a main display unit of a mobile telephone, two sub-display units are accommodated that are adapted to be pulled out from the housing (see, e.g., Japanese Laid-Open Patent Publication No. 2007-124025). Another conventional mobile communication terminal has a display unit in respective housings that are vertically stacked on one another and that when unfolded, causes the display units to be flatly arranged side by side (see, e.g., Japanese Laid-Open Patent Publication No. 2009-71588). Still further, a displaying apparatus has two display units coupled to one another to enable one display unit to be stacked on the display surface of the other display unit and to move around the other display unit to remain on the back thereof (see, e.g., Japanese Laid-Open Patent Publication No. 2009-109943).

In addition to the foldable electronic devices, sliding-type electronic devices are also present. A sliding-type electronic device transitions between a closed state and an open state consequent to an upper housing thereof sliding on the lower housing thereof. In the closed state, the upper housing overlaps the lower housing and therefore, the upper surface of the lower housing is hidden beneath the upper housing. In the open state, the lower housing and the upper housing are shifted with respect to one another, whereby the upper surface of the lower housing is exposed.

Nonetheless, with a conventional sliding-type electronic device, the upper housing overlaps a portion of the lower housing in the open state and therefore, the area of the exposed portion of the upper surface of the lower housing is smaller than the area of the upper surface of the upper housing. Therefore, a problem arises in that display units of, for example, the same size cannot be disposed in the exposed portion of the upper surface of the lower housing and the upper surface of the upper housing.

SUMMARY

According to an aspect of an embodiment, an electronic device includes an upper housing that has a display unit on an upper surface; a lower housing that supports the upper housing so as to enable sliding; a movable plate unit that is disposed on an upper surface of the lower housing so as to enable sliding; and a movement mechanism that causes the movable plate unit to slide in a direction opposite to a direction in which the upper housing slides, coinciding with a sliding of the upper housing with respect to the lower housing. The movement mechanism causes, during transition into a closed state where the upper housing overlaps the lower housing, the movable plate unit to move beneath the upper housing such that an upper surface of the movable plate unit is hidden and causes, during transition into an open state where the lower and the upper housings are staggered with respect to one another, the movable plate unit to move in the direction opposite to the direction of the upper housing such that the upper surface of the movable plate unit is exposed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An embodiment of an electronic device will be described in detail with reference to the accompanying drawings. In the examples below, identical components are given the same reference numeral and redundant descriptions are omitted.

Figure 1:
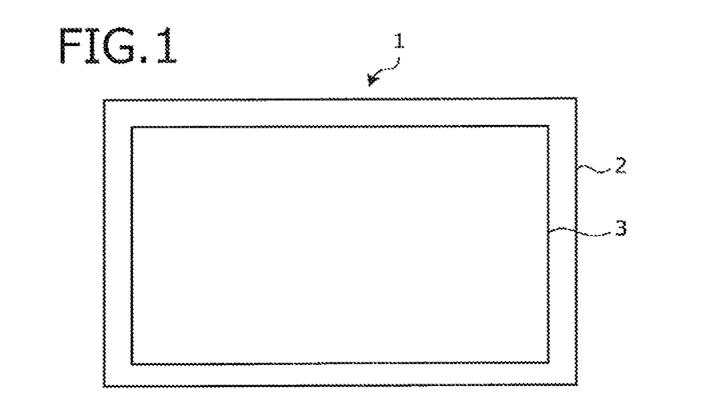
FIG. 1 is a plan view of a first example of an electronic device in a closed state, according to an embodiment.
Figure 2:
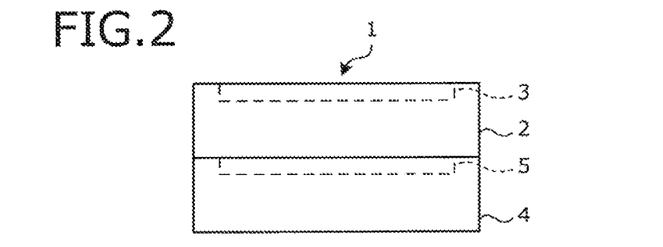
FIG. 2 is a side view of the first example of the electronic device in the closed state, according to the embodiment.
Figure 3:
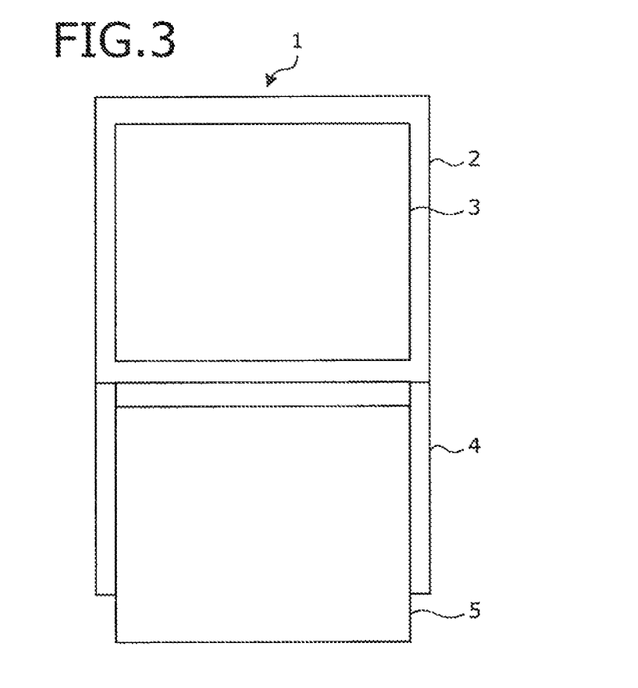
FIG. 3 is a plan view of the electronic device in an open state.
Figure 4:
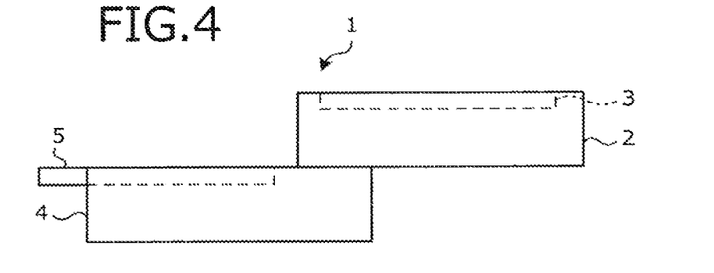
FIG. 4 is a side view of the electronic device in the open state.

FIGS. 1 and 2 respectively are a plan view and a side view of a first example of an electronic device in a closed state, according to the embodiment. FIGS. 3 and 4 respectively are a plan view and a side view of the electronic device in an open state.

As depicted in FIGS. 1 and 2, the electronic device 1 includes an upper housing 2, a display unit 3, a lower housing 4, and a movable plate unit 5. The display unit 3 is disposed in an upper surface of the upper housing 2. The lower housing 4 supports the upper housing 2 such that the upper housing 2 is able to slide. As depicted in FIGS. 3 and 4, the upper housing 2 is adapted to be able to slide with respect to the lower housing 4. The movable plate unit 5 is disposed on the upper surface of the lower housing 4, enabling sliding of the movable plate unit 5.

As depicted in FIG. 2, when the electronic device 1 is in the closed state, the upper housing 2 is above the lower housing 4, substantially overlapping the lower housing 4 by sliding with respect to the lower housing 4. Consequently, the movable plate unit 5 is positioned beneath the upper housing 2 and the upper surface of the movable plate unit 5 is hidden beneath the upper housing 2. The display unit 3 in the upper surface of the upper housing 2 is exposed.

As depicted in FIGS. 3 and 4, when the electronic device 1 is in the open state, the lower and the upper housings 4 and 2 are staggered with respect to one another by the upper housing 2 sliding with respect to the lower housing 4 and. Consequently, the display unit 3 in the upper surface of the upper housing 2 and the upper surface of the movable plate unit 5 of the lower housing 4 are exposed. The electronic device 1 has a movement mechanism (not depicted). In the open state, the movement mechanism causes the movable plate unit 5 to move in a direction opposite to the direction of the movement of the upper housing 2. Thereby, for example, the entire upper surface of the movable plate unit 5 may be exposed.

The movement mechanism may be implemented by, for example, a link mechanism, a gear mechanism, or a combination thereof. The upper surface of the movable plate unit 5 may be, for example, a display unit, or a keyboard or a touch panel that are used to input characters and symbols into the electronic device 1. If the upper surface of the movable plate unit 5 is a display unit, the display unit 3 in the upper surface of the upper housing 2 and the display unit in the upper surface of the movable plate unit 5 of the lower housing 4 each display an image in the open state; and in the closed state, the display unit 3 in the upper surface of the upper housing 2 displays an image.

Figure 5:
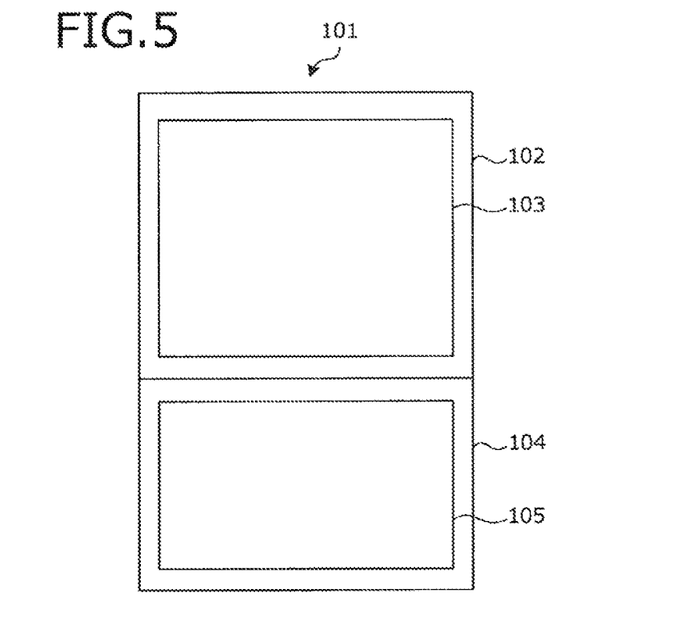
FIG. 5 is a plan view the open state of an electronic device whose upper surface portion of a lower housing does not slide.
Figure 6:
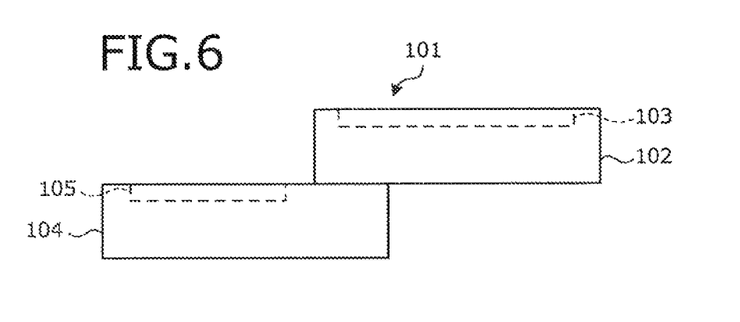
FIG. 6 is a side view of the open state of the electronic device whose upper surface portion of the lower housing does not slide.

FIGS. 5 and 6 respectively are a plan view and a side view of an open state of an electronic device whose upper surface portion of a lower housing does not slide. As depicted in FIGS. 5 and 6, the electronic device 101 includes an upper housing 102 that can be slid with respect to a lower housing 104. However, the upper surface portion of the lower housing 104 does not slide during a transition between the closed state and the open state of the electronic device 101.

Because the upper surface portion of the lower housing 104 does not slide, the area of the exposed portion of the upper surface of the lower housing 104 in the open state is smaller than the area of the upper surface of the upper housing 102 by an area corresponding to that of the overlapping portion of the lower and the upper housings 104 and 102. Therefore, when first and second display units 103 and 105 whose sizes are as large as possible are disposed respectively in the upper surfaces of the upper and the lower housings 102 and 104, the size of the second display unit 105 is smaller than that of the first display unit 103.

According to the electronic device 1 depicted in FIGS. 1 to 4, when the electronic device 1 is opened, the movable plate unit 5 moves in the direction opposite to the direction of the movement of the upper housing 2 and thereby, in the open state, a portion of the movable plate unit 5 is exposed, the portion being the portion that is positioned at the portion of the lower housing 4 overlapped by the upper housing 2 in the closed state. Thereby, the exposed area of the upper surface of the movable plate unit 5 can be increased in the open state compared to the electronic device 101 whose upper surface portion of the lower housing does not slide, as depicted in FIGS. 5 and 6. The increase of the exposed area of the upper surface of the movable plate unit 5 in the open state of the electronic device 1 enables an increase of the exposed area of the upper surface of the lower housing 4.

For example, if the upper surface of the movable plate unit 5 is a display unit, the increase of the exposed area of the upper surface of the movable plate unit 5 in the open state enables a display unit of a size that is, for example, the same as that of the display unit 3 in the upper housing 2, to be disposed in the movable plate unit 5. Furthermore, if the upper surface of the movable plate unit 5 is a keyboard or a touch panel, the surface of the keyboard or the touch panel to be touched by fingers can be widened and therefore, the operability is improved for the input of characters and symbols.

The electronic device 1 may be a mobile communication terminal such as, for example, a mobile telephone or a smartphone, may be a mobile music player or a mobile game machine, or may be a measuring instrument or an analyzer that measures an item concerning the environment such as radiation or a contaminant. The electronic device 1 is not limited to a mobile apparatus. A case will be described where the movement mechanism is implemented by a link mechanism and a display module is disposed in the movable plate unit 5. The display module of the movable plate unit 5 is an example of the second display unit.

Figure 7:
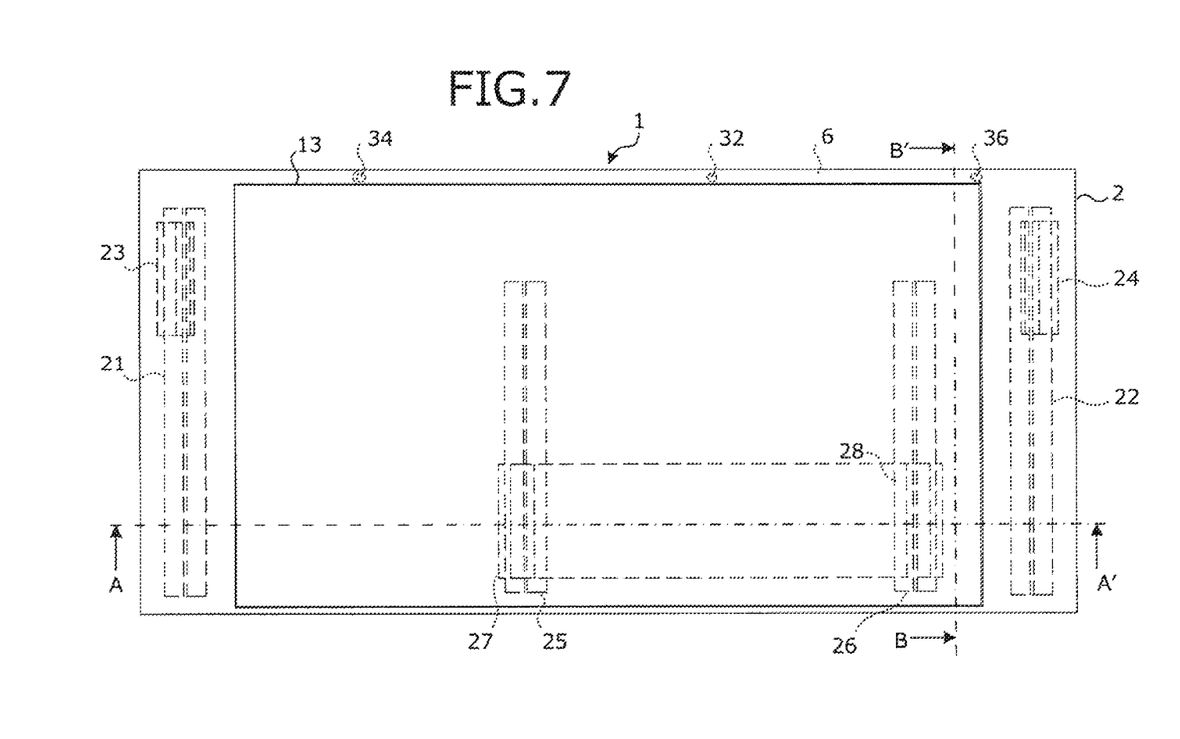
FIG. 7 is a plan view of a second example of the electronic device in a closed state, according to the embodiment.
Figure 8:
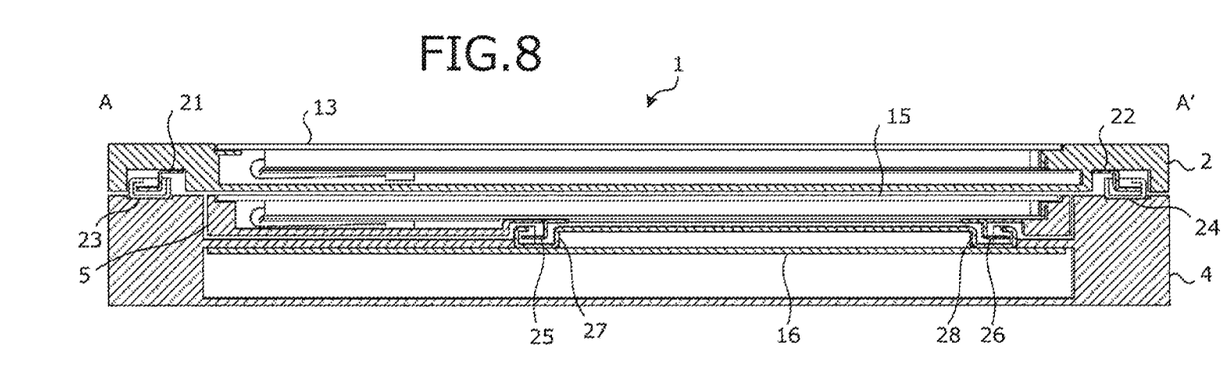
FIG. 8 is a front cross-sectional view taken along a line A-A' indicated in FIG. 7.
Figure 9:
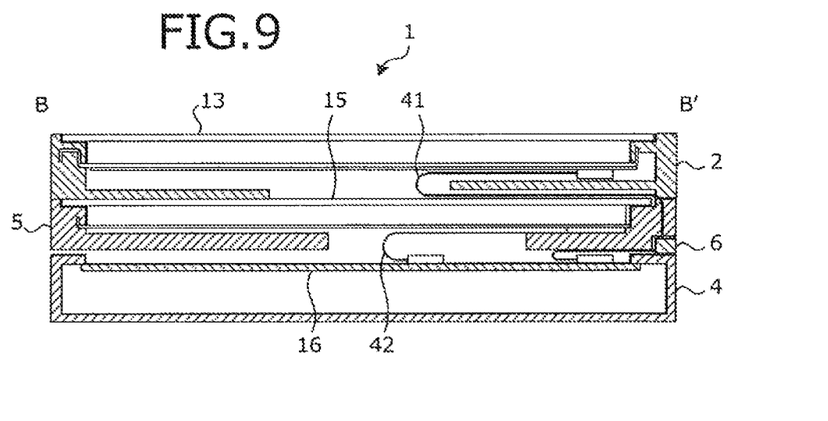
FIG. 9 is a side cross-sectional view taken along a line B-B' indicated in FIG. 7.
Figure 10:
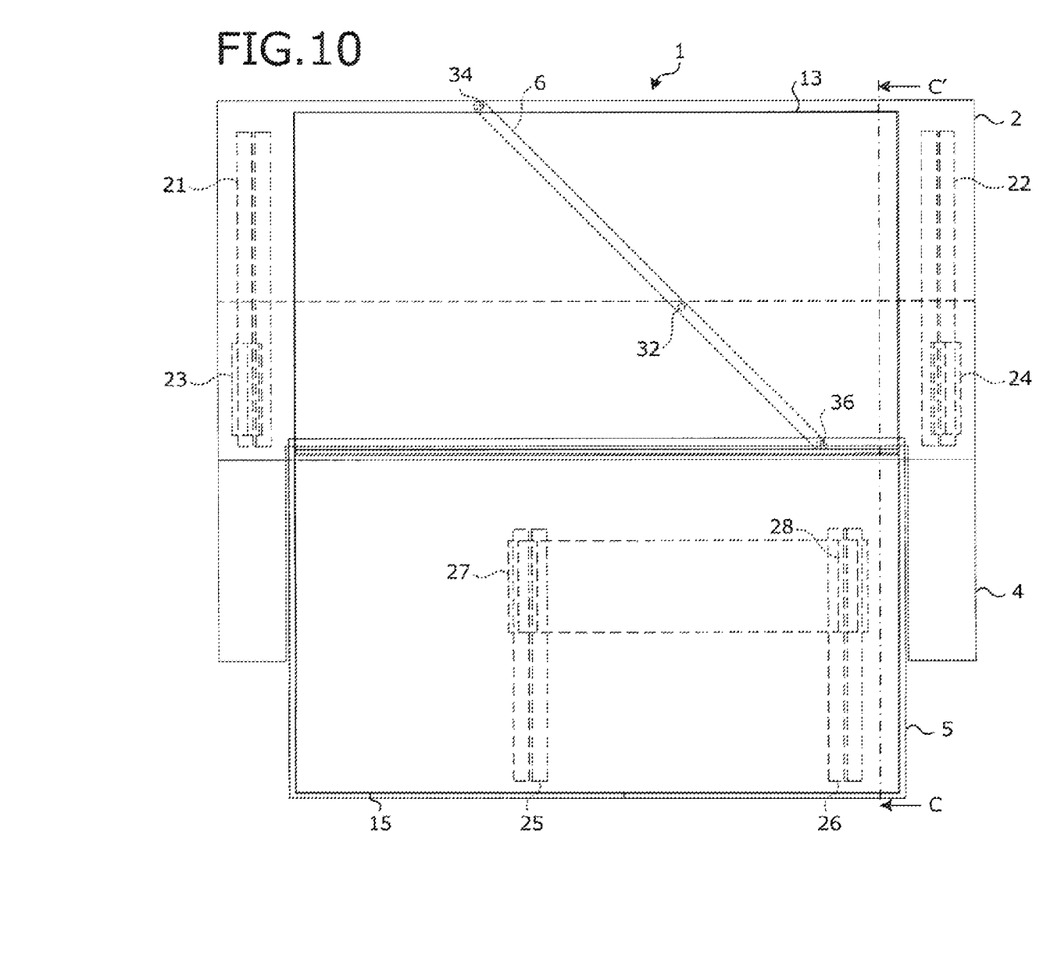
FIG. 10 is a plan view of the second example of the electronic device in the open state, according to the embodiment.
Figure 11:
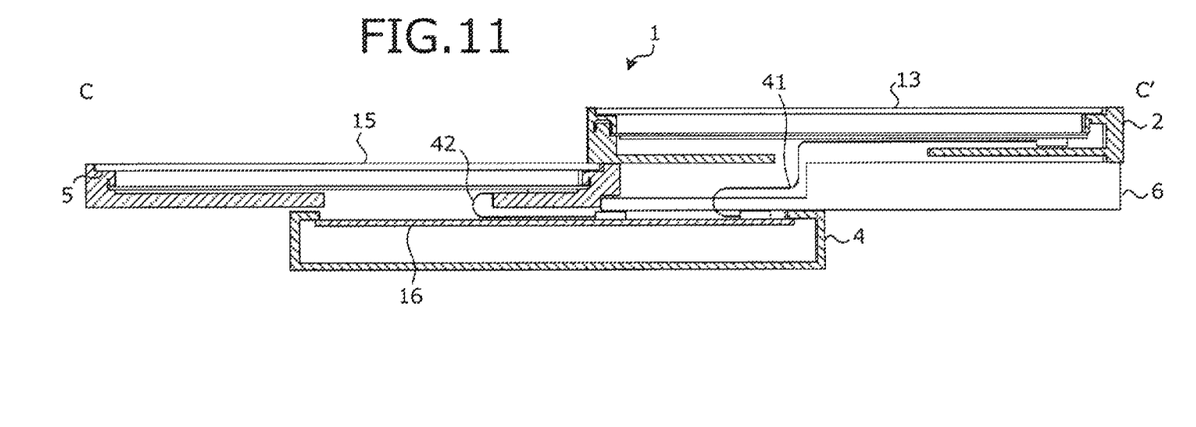
FIG. 11 is a side cross-sectional view taken along a line C-C' indicated in FIG. 10.
Figure 12:
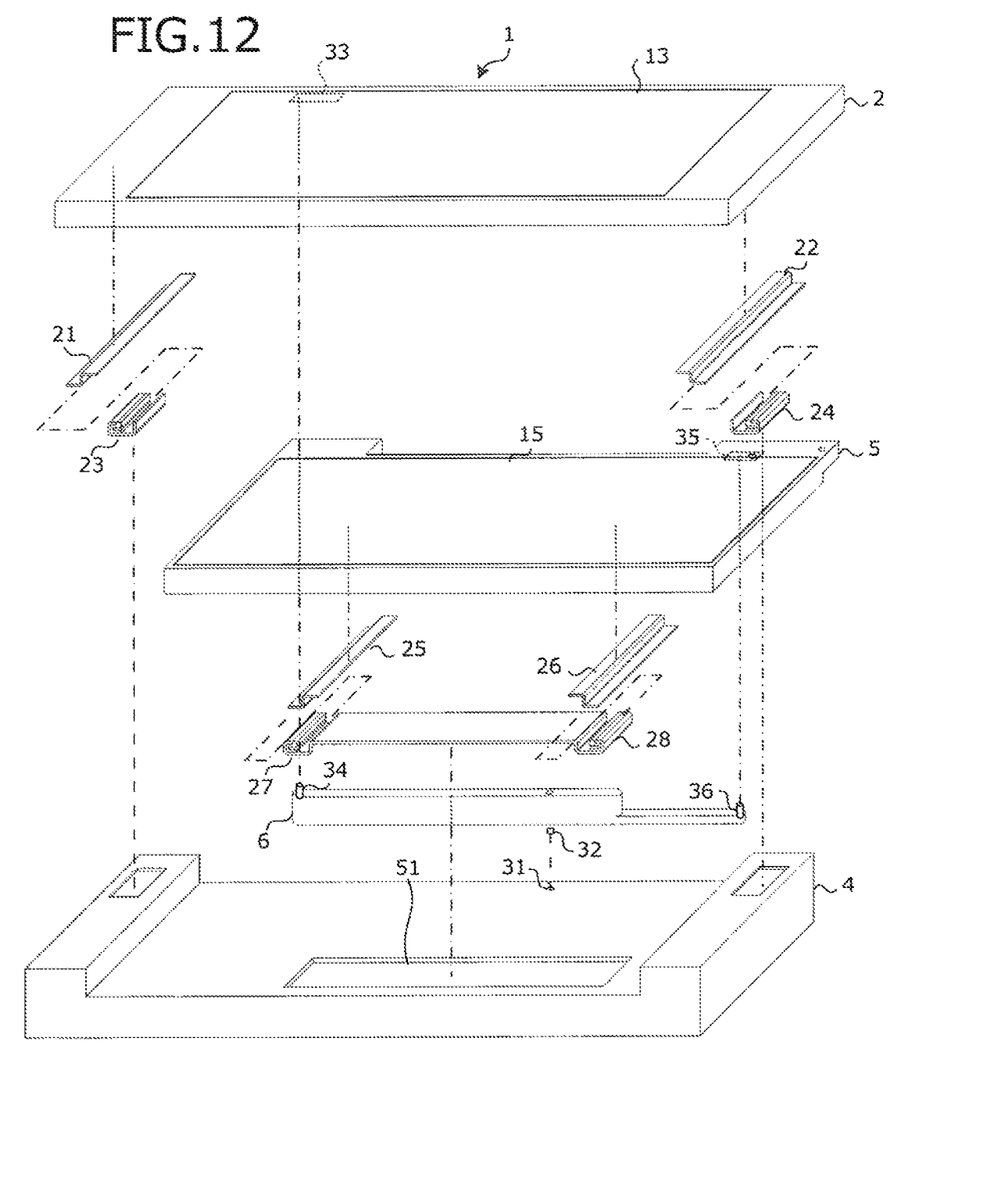
FIG. 12 is an exploded perspective view of the second example of the electronic device according to the embodiment.

FIGS. 7, 8, and 9 respectively are a plan view of a second example of the electronic device in the closed state, according to the embodiment; a front cross-sectional view taken along a line A-A' indicated in FIG. 7, and a side cross-sectional view taken along a line B-B' indicated in FIG. 7. FIGS. 10 and 11 respectively are a plan view of the second example of the electronic device in the open state, according to the embodiment; and a side cross-sectional view taken along a line C-C' indicated in FIG. 10. FIG. 12 is an exploded perspective view of the second example of the electronic device according to the embodiment. In each of the cross-sectional views, hatching is omitted with respect to the display module.

As depicted in FIGS. 7 to 12, the electronic device 1 includes a first display module 13 in the upper surface of the upper housing 2. The first display module 13 is an example of the display unit 3 of the upper housing 2. The first display module 13 may include a touch panel in an upper surface. A frame portion of the upper housing 2 may be formed by, for example, a resin such as an engineered plastic; a metal such as aluminum; or an alloy including a metal such as aluminum.

A second display module 15 is disposed in the upper surface of the movable plate unit 5, is an example of the second display unit, and may include a touch panel in an upper surface. A frame portion of the movable plate unit 5 may be formed by, for example, a resin such as an engineered plastic; a metal such as aluminum; or an alloy including a metal such as aluminum.

The lower housing 4 accommodates, for example, a circuit board 16 and electronic parts not depicted, and may accommodate, for example, a battery. In FIG. 12, the circuit board 16 is not depicted. The lower housing 4 may be formed by, for example, a resin such as an engineered plastic; a metal such as aluminum; or an alloy including a metal such as aluminum.

Rails 21 and 22 extending in the direction for the upper housing 2 to slide are attached to the lower face of the upper housing 2 at ends thereof along a length perpendicular to the direction in which the upper housing 2 slides. On the other hand, rail receiving units 23 and 24 are attached to the upper surface of the lower housing 4 at the ends thereof along a length perpendicular to the direction in which the upper housing 2 slides. The rails 21 and 22 are respectively supported by the rail receiving units 23 and 24 to be freely slidable and thereby, the upper housing 2 is supported by the lower housing 4 so as to enable sliding.

As depicted in FIG. 10, the rail receiving units 23 and 24 may be disposed at positions at which the upper and the lower housings 2 and 4 overlap one another in the open state of the electronic device 1. Disposal of the rail receiving units 23 and 24 accordingly, the rail receiving units 23 and 24 are hidden by the upper housing 2 in the open state of the electronic device 1 and therefore, the electronic device 1 is favorable in design. The rails 21 and 22, and the rail receiving units 23 and 24 may each be formed by a metal such as a stainless steel.

Rails 25 and 26 are attached to the lower face of the movable plate unit 5 and extend along a length thereof, parallel to the direction in which the movable plate unit 5 slides. Rail receiving units 27 and 28 are attached to the upper surface of the lower housing 4. The rails 25 and 26 are respectively supported by the rail receiving units 27 and 28 to be freely slidable and thereby, the movable plate unit 5 is supported by the lower housing 4 so as to enable sliding.

As depicted in FIG. 10, the rail receiving units 27 and 28 may be disposed at positions at which the movable plate unit 5 and the lower housing 4 overlap on another in the open state of the electronic device 1. Disposal of the rail receiving units 27 and 28 accordingly, the rail receiving units 27 and 28 are hidden by the movable plate unit 5 in the open state of the electronic device 1 and therefore, the electronic device 1 is favorable in design. The rails 25 and 26, and the rail receiving units 27 and 28 may each be formed by a metal such as a stainless steel.

The first display module 13 may include a display face of a size that is as large as possible and positioned to avoid the portion to which the rails 21 and 22 of the upper housing 2 are attached. In the open state of the electronic device 1, the area of the exposed portion of the upper surface of the movable plate unit 5 may be equal to or larger than the area of the display face of the first display module 13. A setting of the area accordingly, the second display module 15 that includes a display surface of a size that is the same as that of the first display module 13 can be disposed in the upper surface of the movable plate unit 5, in the portion thereof that is exposed when the electronic device 1 is in the open state.

The second display module 15 may have a display surface of a size that can occupy substantially the entire upper surface portion of the movable plate unit 5, exposed when the electronic device 1 is in the open state. The display faces of the first and the second display modules 13 and 15 may have equivalent lengths perpendicular to the direction in which the movable plate unit 5 slides. The areas of the display faces of the first and the second display modules 13 and 15 may be equivalent.

As depicted in FIG. 11, in the open state of the electronic device 1, of a frame portion around the second display module 15 of the movable plate unit 5, a portion on the side of the upper housing 2 may overlap a portion on the side of the movable plate unit 5 of a frame portion around the first display module 13 of the upper housing 2. By such configuration, the width is reduced to a half thereof of the frame portion between the first and the second display modules 13 and 15 in the open state of the electronic device 1. Thereby, when an image is displayed using the first and the second display modules 13 and 15 as one display surface, the width is reduced of the portion not displaying the image between the display faces of the first and the second display modules 13 and 15 and thereby, consolidated display is enabled.

The electronic device 1 includes the movement mechanism that causes the movable plate unit 5 to slide in the direction opposite to the direction in which the upper housing 2 moves, coinciding with the sliding movement of the upper housing 2 with respect to the lower housing 4. The movement mechanism may include an arm 6 that couples the upper housing 2 and the movable plate unit 5 to the lower housing 4. The arm 6 may be formed by, for example, a resin such as an engineered plastic, or a metal.

For example, in the open state of the electronic device 1, in the portion for the upper and the lower housings 2 and 4 that overlap one another, for example, a hole 31 may be formed at a position facing a center of the portion in a vicinity of the edge of the lower housing 4. On the other hand, for example, a central portion of the arm 6 may have a shaft 32 attached thereto such that the shaft 32 protrudes from the arm 6. The arm 6 may be supported by the lower housing 4 to enable rotation centered about the shaft 32, by loosely inserting the shaft 32 of the arm 6 into the hole 31 of the lower housing 4. With this configuration, the arm 6 rotates about the shaft 32, accompanying the sliding movement of the upper housing 2.

For example, the upper housing 2 may have a slotted hole 33 disposed therein that is elongated in a direction perpendicular to the direction in which the upper housing 2 slides. On the other hand, for example, one end of the arm 6 may have a first protrusion 34 attached thereto such that the first protrusion 34 protrudes from the arm 6. The arm 6 may be coupled to the upper housing 2 by loosely inserting the first protrusion 34 of the arm 6 into the slotted hole 33 of the upper housing 2. With this configuration, the one end of the arm 6 moves in a direction perpendicular to the direction in which the upper housing 2 slides, along the slotted hole 33 of the upper housing 2 and accompanying the sliding movement of the upper housing 2. The one end of the arm 6 is positioned outside the electronic device 1 in the closed state thereof and is positioned facing the center thereof in the open state thereof.

For example, the movable plate unit 5 may have a slotted hole 35 disposed therein that is elongated in the direction perpendicular to the direction in which the movable plate unit 5 slides. On the other hand, for example, the other end of the arm 6 may have a second protrusion 36 attached thereto such that the second protrusion 36 protrudes from the arm 6. The arm 6 may be coupled to the movable plate unit 5 by loosely inserting the second protrusion 36 of the arm 6 into the slotted hole 35 of the moving plate unit 5. With this configuration, the other end of the arm 6 moves in the direction perpendicular to the direction in which the movable plate unit 5 slides, along the slotted hole 35 of the movable plate unit 5 and accompanying the sliding movement of the movable plate unit 5. The other end of the arm 6 is positioned outside the electronic device 1 in the closed state thereof and is positioned facing the center thereof in the open state thereof.

With this link mechanism, when the upper housing 2 slides, causing the electronic device 1 to transition from the closed state to the open state, the arm 6 rotates about the shaft 32, accompanying the sliding movement of the upper housing 2. Thereby, in the closed state of the electronic device 1, the arm 6 extending in the direction perpendicular to the direction in which the upper housing 2 slides gradually inclines and the other end of the arm 6 pushes the movable plate unit 5 in the direction opposite to the direction in which the upper housing 2 moves.

The first and the second display modules 13 and 15, and the circuit board 16 in the lower housing 4 are electrically connected to one another by, for example, flexible printed circuit boards 41 and 42. The flexible printed circuit board 41, which extends from the first display module 13, extends in, for example, the direction opposite to the direction in which the upper housing 2 moves; is pulled out from an opening in a bottom surface of the upper housing 2; is pulled from an opening of the lower housing 4 into the lower housing 4, avoiding the movable plate unit 5; and is connected to the circuit board 16. The flexible printed circuit board 42, which extends from the second display module 15, is pulled out from, for example, an opening in the bottom face of the movable plate unit 5; is pulled from the opening of the lower housing 4 into the lower housing 4; and is connected to the circuit board 16.

Figure 13:
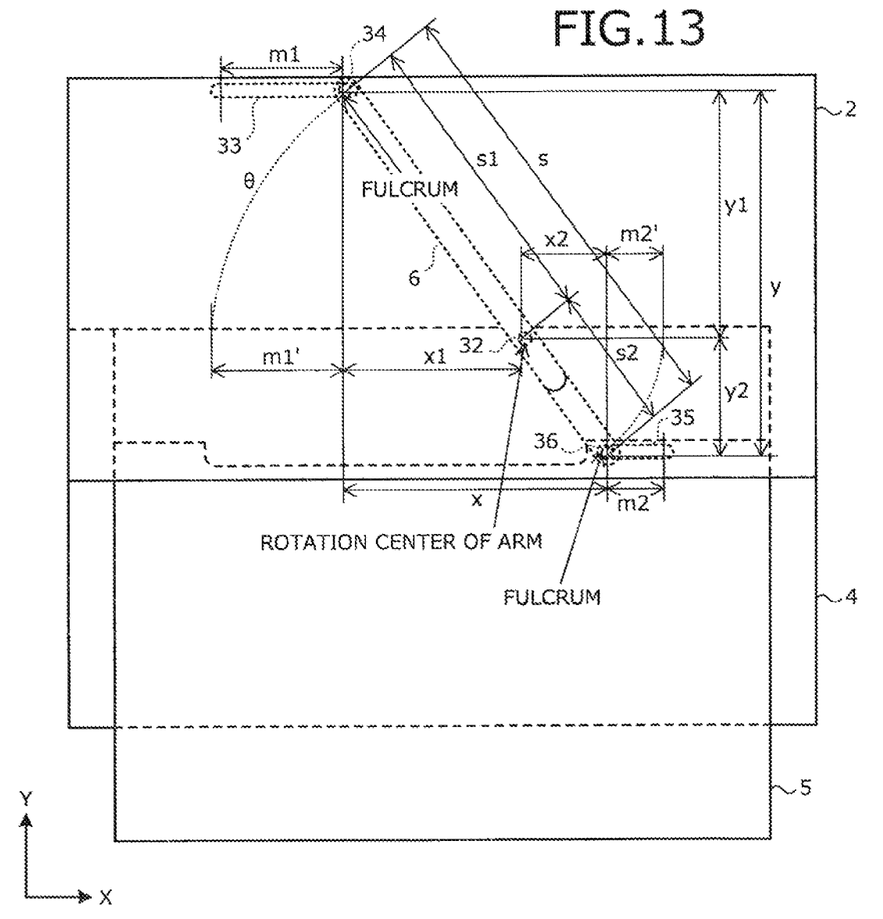
FIG. 13 is a diagram of dimensional relations in the second example of the electronic device according to the embodiment.

FIG. 13 is a diagram of dimensional relations in the second example of the electronic device according to the embodiment. In FIG. 13, for example, the direction in which the upper housing 2 slides is represented by "Y-direction" and the direction perpendicular thereto is represented by "X-direction".

As depicted in FIG. 13, the length from the shaft 32, which is the center of rotation of the arm 6, to the first protrusion 34 will be denoted by "s1"; the length therefrom to the second protrusion 36 will be denoted by "s2"; and the total of these lengths will be denoted by "s". An angle that is formed by the arm 6 in the closed state of the electronic device 1 and the arm 6 in the open state thereof will be denoted by "θ". "θ" is an arbitrary angle because this angle is affected by the layout and the dimensions of the parts of the electronic device 1.

The amount of sliding by the upper housing 2 will be denoted by "y1". The amount of sliding by the movable plate unit 5 will be denoted by "y2". The total of these amounts of sliding will be denoted by "y". "y1", "y2", and "y" are respectively expressed by Equations (1), (2), and (3) below.

$$y1 = s1 \cdot \sin\theta \quad (1)$$

$$y2 = s2 \cdot \sin\theta \quad (2)$$

$$y = (s1+s2)\sin\theta = s \cdot \sin\theta \quad (3)$$

In the open state of the electronic device 1, the length in the X-direction from the shaft 32, which is the center of the rotation of the arm 6, to the first protrusion 34 will be denoted by "x1"; the length in the X-direction therefrom to the second protrusion 36 will be denoted by "x2"; and the total of these lengths will be denoted by "x". "x1", "x2", and "x" are respectively expressed by Equations (4), (5), and (6) below.

$$x1 = s1 \cdot \cos\theta \quad (4)$$

$$x2 = s2 \cdot \cos\theta \quad (5)$$

$$x = (s1+s2)\cos\theta = s \cdot \cos\theta \quad (6)$$

The length in the X-direction of the slotted hole 33 of the upper housing 2 will be denoted by "m1". The length therein of the slotted hole 35 of the movable plate unit 5 will be denoted by "m2". "m1" and "m2" are respectively expressed by Equations (7) and (8) below. "m1" and "m2" may respectively be the same as "m1'" and "m2'" or may have somewhat larger dimensions respectively than those of "m1'" and "m2'" taking into consideration deviations generated when the electronic device 1 is fabricated.

$$m1' = s1 - x1 = s1 - s1 \cdot \cos\theta = (1-\cos\theta)s1 \quad (7)$$

$$m2' = s2 - x2 = s2 - s2 \cdot \cos\theta = (1-\cos\theta)s2 \quad (8)$$

When such lengths are determined as the length s1 from the shaft 32, which is the center of the rotation of the arm 6, to the first protrusion 34; the length s2 therefrom to the second protrusion 36; the length m1 or m1' of the slotted hole 33 of the upper housing 2; and the length m2 to m2' of the slotted hole 35 of the movable plate unit 5, the rotation angle θ of the arm 6 is determined in the open state of the electronic device 1. When s1, s2, and θ are determined, the amount y1 of the sliding of the upper housing 2 and the amount y2 of the sliding of the movable plate unit 5 are determined from Equations (1) and (2). Therefore, when the width of the frame portion of the movable plate unit 5 is determined, for example, in the open state of the electronic device 1, the amounts of the sliding of the upper housing 2 and the movable plate unit 5 can be set such that, as described above, the portion on the side of the upper housing 2 of the frame portion of the movable plate unit 5 overlaps the portion on the side of the movable plate unit 5 of the frame portion of the upper housing 2.

Figure 14:
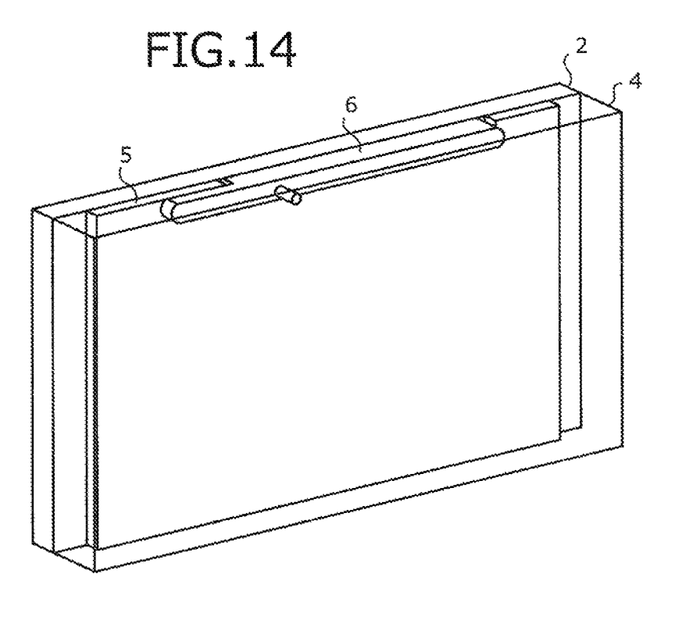
FIG. 14 is a perspective view seen from the rear, in the closed state of the second example of the electronic device according to the embodiment.
Figure 15:
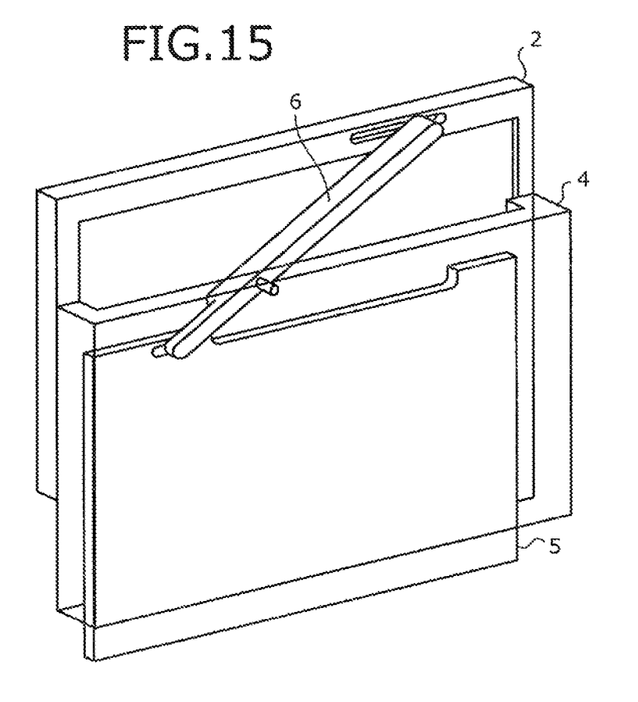
FIG. 15 is a perspective view seen from the rear, in an intermediate state between the opened and the closed states of the second example of the electronic device according to the embodiment.
Figure 16:
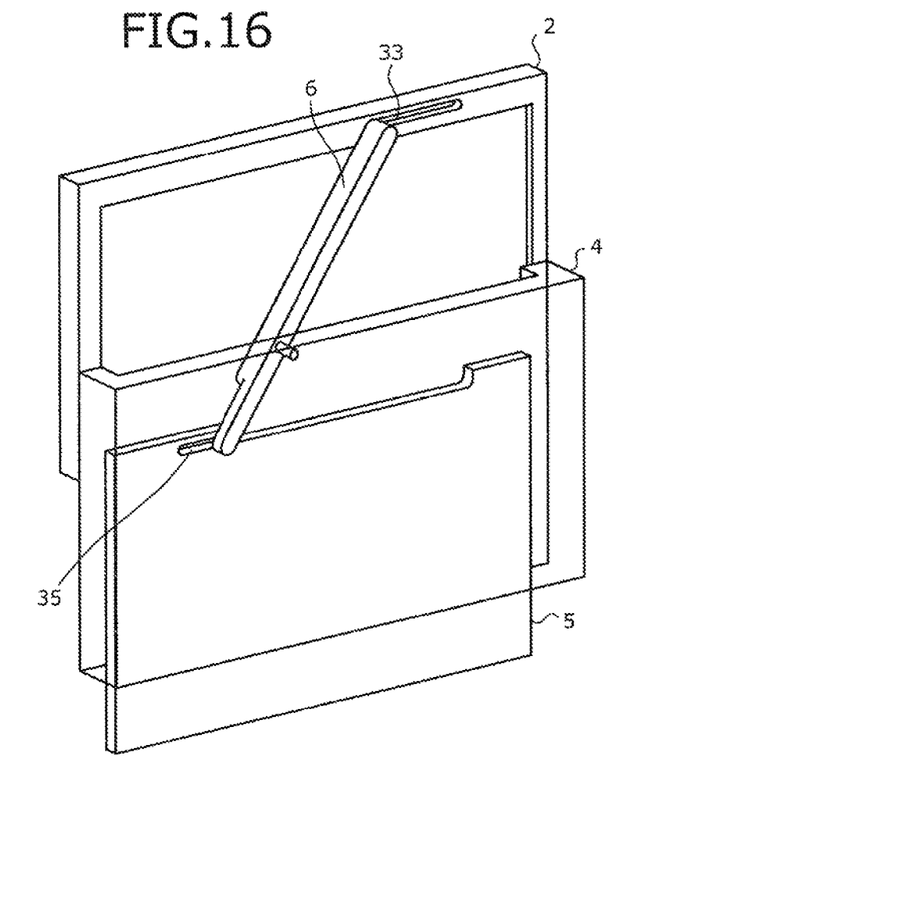
FIG. 16 is a perspective view seen from the rear, in the open state of the second example of the electronic device according to the embodiment.

FIGS. 14, 15, and 16 respectively are perspective views seen from the rear in the closed state; an intermediate state between the opened and the closed states; and the open state of the second example of the electronic device according to the embodiment. In FIGS. 14 to 16, to clearly depict the state of the sliding move of the movable plate unit 5 and the state of the rotation of the arm 6, only an outline is depicted by lines for the lower housing 4 and the movable plate unit 5 and the arm 6 are visible through the lower housing 4.

As depicted in FIG. 14, in the closed state of the electronic device 1, the movable plate unit 5 and the upper housing 2 overlap the lower housing 4 and the arm 6 extends in the direction perpendicular to the direction in which the upper housing 2 slides. As depicted in FIG. 15, when the upper housing 2 slides with respect to the lower housing 4, the incline of the arm 6 is increased accompanying the increase of the move amount of the upper housing 2, and the other end of the arm 6 moves in the direction for the arm 6 to move away from the upper housing 2. Thereby, the movable plate unit 5 is pushed in the direction opposite to the direction in which the upper housing 2 moves.

As depicted in FIG. 16, in the open state of the electronic device 1, the first protrusion 34 of the one end of the arm 6 abuts an edge on the side of the center of the slotted hole 33 of the upper housing 2, and the second protrusion 36 of the other end of the arm 6 abuts an edge on the side of the center of the slotted hole 35 of the movable plate unit 5 and thereby, the rotation of the arm 6 is stopped. Thereby, the sliding of each of the upper housing 2 and the movable plate unit 5 is stopped.

When the upper housing 2 slides causing the state of the electronic device 1 to transition from the open state depicted in FIG. 16 back to the closed state, as depicted in FIG. 15, the incline of the arm 6 is reduced accompanying the approach of the upper housing 2 to the closed state and the other end of the arm 6 moves in the direction for the other end to approach the upper housing 2. Thereby, the movable plate unit 5 is pulled toward the upper housing 2.

As depicted in FIG. 14, in the closed state of the electronic device 1, the first protrusion 34 of the one end of the arm 6 abuts the edge on the outer side of the slotted hole 33 of the upper housing 2 and the second protrusion 36 of the other end of the arm 6 abuts the edge on the outer side of the slotted hole 35 of the movable plate unit 5 and thereby, the rotation of the arm 6 is stopped. Thereby, the sliding of each of the upper housing 2 and the movable plate unit 5 is stopped.

Figure 17:
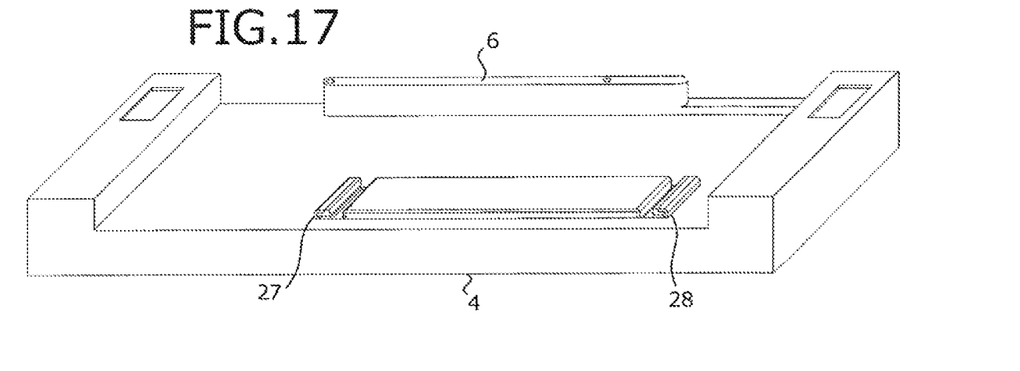
FIGS. 17, 18, 19, 20, 21, and 22 are perspective views of a state where the second example of the electronic device according to the embodiment is in a course of fabrication.

FIGS. 17, 18, 19, 20, 21, and 22 are perspective views of a state where the second example of the electronic device according to the embodiment is in a course of fabrication. As depicted in FIG. 17, the arm 6 and the rail receiving units 27 and 28 are attached to the lower housing 4. As depicted in FIG. 12, the arm 6 can be attached to the lower housing 4 by inserting the shaft 32 of the arm 6 into the hole 31 of the lower housing 4.

The rail receiving units 27 and 28 may be attached to the lower housing 4 by using a double-faced adhesive tape or an adhesive, or may be clamped to the lower housing 4 with screws. For example, as depicted in FIG. 12, a recess 51 may be formed at a position in the lower housing 4 at which the rail receiving units 27 and 28 are attached to the lower housing 4. With such execution, the fabrication becomes easy because the positioning can be completed by merely dropping the rail receiving units 27 and 28 into the recess 51 of the lower housing 4.

Figure 18:
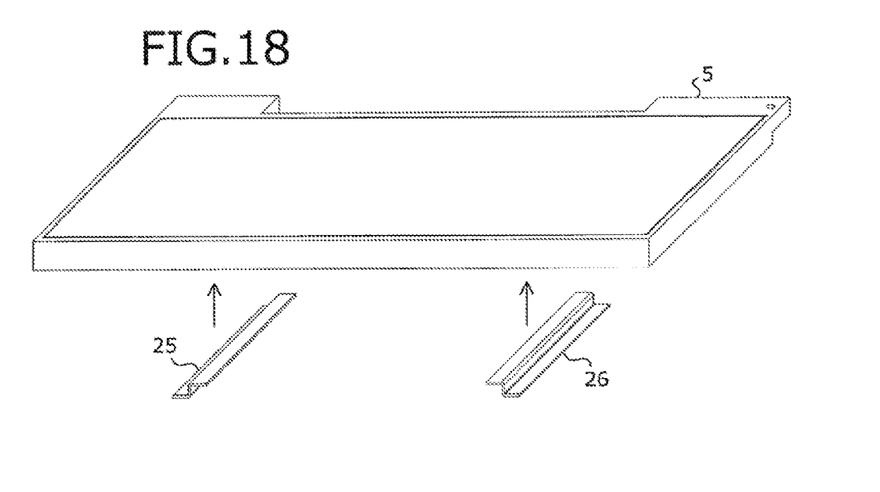

On the other hand, as depicted in FIG. 18, the rails 25 and 26 are attached to the movable plate unit 5. The rails 25 and 26 may be attached to the movable plate unit 5 by using a double-faced adhesive tape or an adhesive, or may be clamped to the movable plate unit 5 with screws. Similar to the attachment of the rail receiving units 27 and 28 to the lower housing 4, for example, a recess may be formed at a position in the movable plate unit 5, at which the rails 25 and 26 are attached to the movable plate unit 5. With such execution, the fabrication becomes easy because the positioning can be completed by merely dropping the rails 25 and 26 into the recess of the movable plate unit 5.

Figure 19:
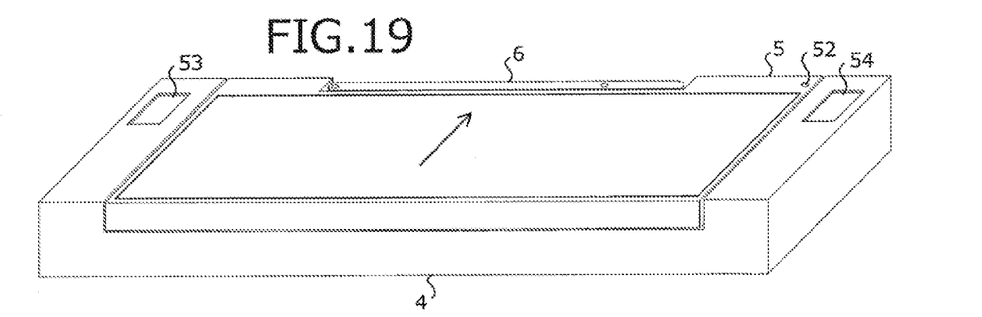

As depicted in FIG. 19, the movable plate unit 5 slides with respect to the lower housing 4 as indicated by an arrow to attach the movable plate unit 5 to the lower housing 4 such that the rails 25 and 26 of the movable plate unit 5 advance respectively in the rail receiving units 27 and 28 of the lower housing 4. For example, a pin 52 to be the second protrusion 36 is pushed to be inserted from, for example, a hole disposed in the upper surface of the movable plate unit 5 into the movable plate unit 5 for a depth greater than the thickness of the frame portion of the movable plate unit 5, and the upper end of the pin 52 is put into the slotted hole 35 of the movable plate unit 5. Thereby, the movable plate unit 5 is coupled to the arm 6.

Figure 20:
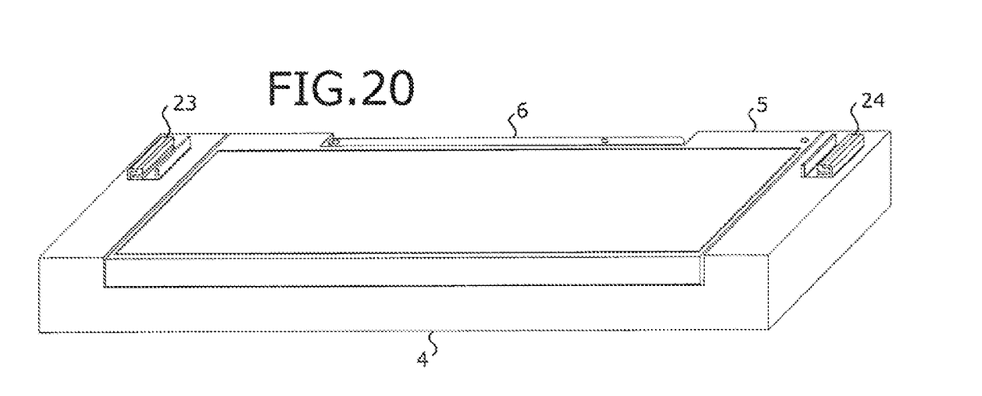

As depicted in FIG. 20, the rail receiving units 23 and 24 are attached to the lower housing 4. The rail receiving units 23 and 24 may be attached to the lower housing 4 by using a double-faced adhesive tape or an adhesive, or may be clamped to the lower housing 4 with screws. For example, as depicted in FIG. 19, recesses 53 and 54 may be formed at positions in the lower housing 4, where the rail receiving units 23 and 24 are attached to the lower housing 4. With such execution, the fabrication becomes easy because the positioning can be completed by merely dropping the rail receiving units 23 and 24 into the recesses 53 and 54 of the lower housing 4. The rail receiving units 23 and 24 may be attached to the lower housing 4 before the movable plate unit 5 is attached to the lower housing 4.

Figure 21:
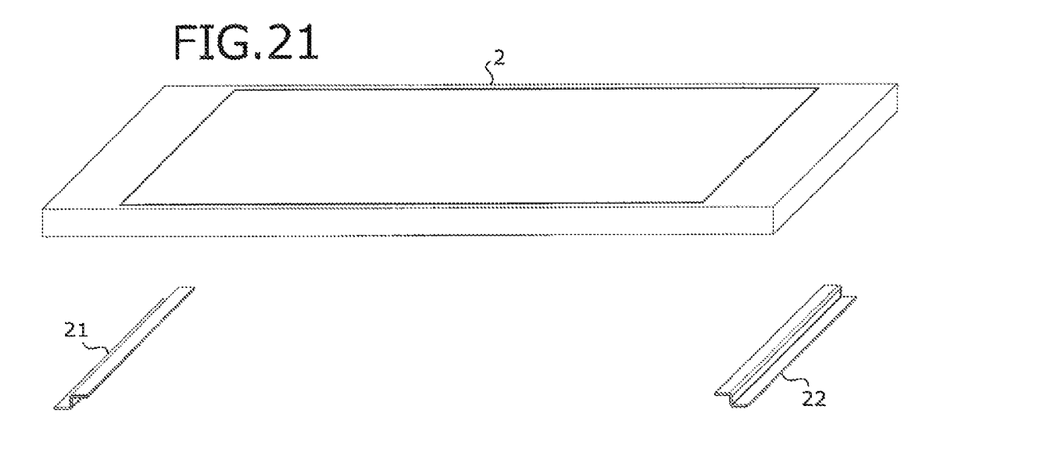

On the other hand, as depicted in FIG. 21, the rails 21 and 22 are attached to the upper housing 2. The rails 21 and 22 may be attached to the upper housing 2 by using a double-faced adhesive tape or an adhesive, or may be clamped to the upper housing 2 with screws. Similar to the attachment of the rail receiving units 23 and 24 to the lower housing 4, for example, a recess may be formed at a position of the upper housing 2 at which the rails 21 and 22 are attached to the upper housing 2. Executing accordingly, the fabrication becomes easy because the positioning can be completed by merely dropping the rails 21 and 22 into the recess of the upper housing 2.

Figure 22:
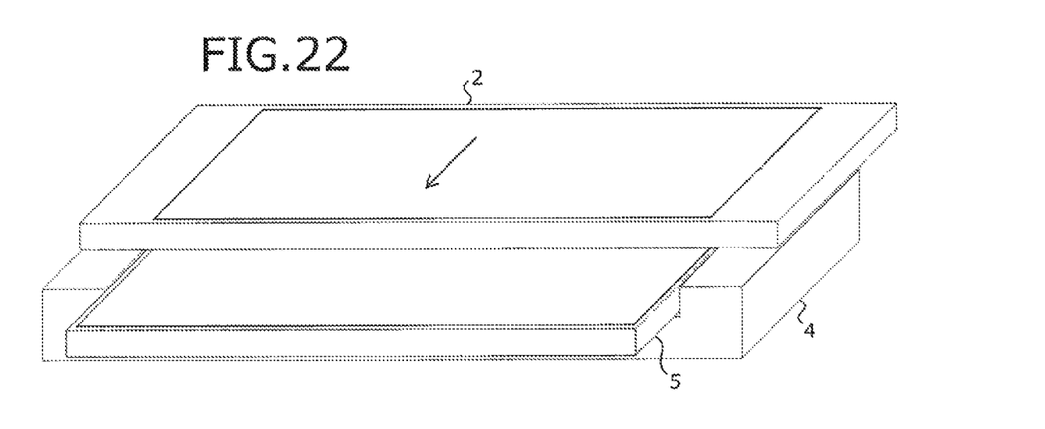

As depicted in FIG. 22, the upper housing 2 slides with respect to the lower housing 4 as indicated by an arrow to attach the upper housing 2 to the lower housing 4 such that the rails 21 and 22 of the upper housing 2 advance respectively in the rail receiving units 23 and 24 of the lower housing 4. When the movable plate unit 5 slides to a position for the open state of the electronic device 1, for example, a pin to be the first protrusion 34 is inserted from the lower side of the arm 6; and the upper end of the pin is put into the slotted hole 33 of the upper housing 2. Thereby, the upper housing 2 is coupled to the arm 6. Thus, the fabrication of the electronic device 1 is completed.

According to the electronic device 1 depicted in FIGS. 7 to 13, when the electronic device 1 is opened, the movable plate unit 5 moves in the direction opposite to the direction in which the upper housing 2 moves and the exposed area is increased of the upper surface of the movable plate unit 5 in the open state. Thereby, the exposed area can be increased of the upper surface of the lower housing 4 in the open state of the electronic device 1. The increase of the exposed area of the upper surface of the movable plate unit 5 in the open state enables the disposal of display modules having the display surfaces of the same size, onto the movable plate unit 5 and the upper housing 2.

According to the electronic device, an effect is achieved that the sliding movement of the movable plate unit enables expansion of the exposed area of the upper surface of the lower housing in the open state.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic device comprising:
   an upper housing that has a display unit on an upper surface;
   a lower housing that supports the upper housing so as to enable sliding;
   a movable plate unit that is disposed on an upper surface of the lower housing so as to enable sliding; and
   a movement mechanism that causes the movable plate unit to slide in a direction opposite to a direction in which the upper housing slides, coinciding with a sliding of the upper housing with respect to the lower housing, wherein
   the movement mechanism causes, during transition into a closed state where the upper housing overlaps the lower housing, the movable plate unit to move beneath the upper housing such that an upper surface of the movable plate unit is hidden and causes, during transition into an open state where the lower and the upper housings are staggered with respect to one another, the movable plate unit to move in the direction opposite to the direction of the upper housing such that the upper surface of the movable plate unit is exposed, the upper housing has a slotted hole elongated in a direction perpendicular to the direction in which the upper housing slides, the movable plate unit has a slotted hole elongated in the direction perpendicular to the direction in which the movable plate unit slides, the movement mechanism includes an arm having a shaft supported by the lower housing at a central portion of the lower housing, the arm being freely rotatable about the shaft, the arm having one end with a first protrusion protruding from the arm and into the slotted hole of the upper housing, the arm having another end with a second protrusion protruding from the arm and into the slotted hole of the movable plate unit, the arm rotates accompanying the sliding of the upper housing, with the first protrusion of the arm moving in the slotted hole of the upper housing and with the second protrusion of the arm moving in the slotted hole of the movable plate unit to cause the movable plate unit to move in the direction opposite to the direction in which the upper housing slides, and the arm having dimensions according to $m1 \geq (1-\cos\theta)s1$ and $m2 \geq (1-\cos\theta)s2$, with s1 being a length from the shaft to the first protrusion, s2 being a length from the shaft to second protrusion 36, m1 being a length of the slotted hole in the upper housing in the direction perpendicular to the direction in which the upper housing slides, and m2 being a length of the slotted hole in the movable plate unit in the direction perpendicular to the direction in which the movable plate unit slides.

2. The electronic device according to claim 1, wherein the movable plate unit includes a second display unit in the upper surface, and moves such that, when the lower and the upper housings are maximally staggered with respect to one another, a portion of the second display unit is exposed, the portion being a portion that is positioned at a portion of the lower housing overlapped by the upper housing in the closed state.

3. The electronic device according to claim 1, wherein an area of a portion in the upper surface of the movable plate unit exposed when the lower and the upper housings are maximally staggered with respect to one another, is at least equal to an area of the display unit of the upper housing.

* * * * *